United States Patent
Abu-Irshaid et al.

(10) Patent No.: US 11,028,705 B2
(45) Date of Patent: Jun. 8, 2021

(54) TRANSITION PIECE HAVING COOLING RINGS

(71) Applicant: DOOSAN HEAVY INDUSTRIES & CONSTRUCTION CO., LTD., Changwon-si (KR)

(72) Inventors: Esam Abu-Irshaid, Lake Worth, FL (US); Michael Brody, Stuart, FL (US); Kevin James Spence, Jupiter, FL (US)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 187 days.

(21) Appl. No.: 15/923,184

(22) Filed: Mar. 16, 2018

(65) Prior Publication Data
US 2019/0284944 A1    Sep. 19, 2019

(51) Int. Cl.
*F01D 25/12* (2006.01)
*F01D 9/02* (2006.01)
*F23R 3/00* (2006.01)

(52) U.S. Cl.
CPC ............. *F01D 9/023* (2013.01); *F01D 25/12* (2013.01); *F23R 3/002* (2013.01); *F05D 2220/32* (2013.01); *F05D 2240/35* (2013.01); *F05D 2260/201* (2013.01); *F05D 2260/202* (2013.01)

(58) Field of Classification Search
CPC . F01D 9/02; F01D 9/023; F01D 25/12; F23R 3/002; F23R 2900/03042; F23R 2900/03043; F23R 2900/03044; F05D 2260/201; F05D 2260/202
See application file for complete search history.

(56) References Cited

U.S. PATENT DOCUMENTS

| | | | |
|---|---|---|---|
| 6,530,221 B1* | 3/2003 | Sattinger | F01D 25/30 181/213 |
| 6,826,913 B2* | 12/2004 | Wright | F23R 3/06 60/772 |
| 6,860,098 B2* | 3/2005 | Suenaga | F23R 3/045 60/39.23 |
| 7,089,741 B2* | 8/2006 | Ikeda | F23R 3/002 60/725 |
| 9,200,526 B2 | 12/2015 | Ito et al. | |
| 9,395,082 B2* | 7/2016 | Tiwary | F23M 5/00 |
| 2001/0004835 A1* | 6/2001 | Alkabie | F23R 3/002 60/757 |
| 2004/0211188 A1* | 10/2004 | Alkabie | F23R 3/002 60/772 |
| 2006/0053798 A1* | 3/2006 | Hadder | F23R 3/007 60/772 |
| 2009/0094985 A1* | 4/2009 | Johnson | F23R 3/002 60/752 |

(Continued)

*Primary Examiner* — Steven M Sutherland
(74) *Attorney, Agent, or Firm* — Invenstone Patent, LLC

(57) ABSTRACT

A transition piece can include: an inner transition piece providing a gas channel; a plurality of cooling rings disposed on the inner transition piece; a plurality of film holes formed on the inner transition piece; and a plurality of impingement holes formed on the plurality of cooling rings, wherein the plurality of film holes are arranged to correspond to the plurality of cooling rings. Each of the plurality of cooling rings includes a cavity such that the plurality of film holes connect the cavity to the gas channel and the plurality of impingement holes connect the cavity to an outside of the inner transition piece.

3 Claims, 7 Drawing Sheets

(56) References Cited

U.S. PATENT DOCUMENTS

| | | | |
|---|---|---|---|
| 2010/0037620 A1* | 2/2010 | Chila | F23R 3/06 |
| | | | 60/752 |
| 2011/0138812 A1* | 6/2011 | Johnson | F23R 3/00 |
| | | | 60/725 |
| 2011/0302924 A1* | 12/2011 | Lee | F01D 9/023 |
| | | | 60/752 |
| 2012/0255308 A1* | 10/2012 | Chandler | F23R 3/002 |
| | | | 60/754 |

* cited by examiner

TRANSITION PIECE HAVING COOLING RINGS

BACKGROUND OF INVENTION

A gas turbine generally comprises a compressor, a combustor, and a turbine. The compressor provides compressed air generated by a plurality of compressor blades to the combustor, wherein the compressed air is high-temperature and high-pressure air. The combustor mixes the compressed air, introduced from the compressor, with fuel and combusts the mixed air. The combusted gas generated from the combustor is discharged to the turbine and the turbine is rotated by the combusted gas, thereby generating power. The generated power is used in various fields such as for the generation of electricity and to drive machinery. The gas turbine is used to drive a generator, an aircraft, a locomotive, and the like.

The gas turbine further comprises a transition piece between the combustor and the turbine. The transition piece guides hot combusted gas from the combustor to the turbine, thus it needs to be cooled effectively to inhibit the combustor or engine from failing. Cooling the transition piece is a challenge due to high temperature of the combusted gas. Though an inner surface of the transition piece can be coated with a Thermal Barrier Coating (TBC) material, the TBC does not guarantee proper shielding of the transition piece from hot gas because the temperature can exceed the metal melting temperature. The transition piece can comprise a flow sleeve for cooling, but this structure increases the combustor pressure drop and thus lowers engine performance. In addition, this sleeve transition piece occupies more space in the engine. Effusion cooling for the transition piece has been used. However, this method allows the combustion air to be leaked through the transition piece for cooling. Thus, this scheme reduces the amount of air to headend which may result in higher emissions. Other cooling schemes such as diffusion bonding design or transient liquid phase bonding allow less air to be leaked through the transition piece compared to effusion cooling and reduce the impact on pressure drop. The cooling performance of this system is, however, much lower than pure effusion cooling. In addition, this system requires more maintenance.

BRIEF SUMMARY

The present invention relates to a combustion system, more particularly, to a transition piece including a cooling ring providing impingement cooling and film cooling.

In an embodiment of the present invention, a transition piece can include: an inner transition piece providing a gas channel; a cooling ring disposed on the inner transition piece and providing a cavity; a film hole connecting the cavity to the gas channel; and an impingement hole connecting the cavity to an outside of the inner transition piece.

In another embodiment of the present invention, a transition piece can include: an inner transition piece providing a gas channel; a plurality of cooling rings disposed on the inner transition piece; a plurality of film holes formed on the inner transition piece; and a plurality of impingement holes formed on the plurality of cooling rings, wherein the plurality of film holes are arranged to correspond to the plurality of cooling rings.

In yet another embodiment of the present invention, a transition piece can include: an inner transition piece providing a gas channel; an outer transition piece surrounding the inner transition piece and spaced apart from the inner transition piece; a plurality of film holes formed on the inner transition piece; and a plurality of impingement holes formed on the outer transition piece.

DETAILED DISCLOSURE

Figure 1:
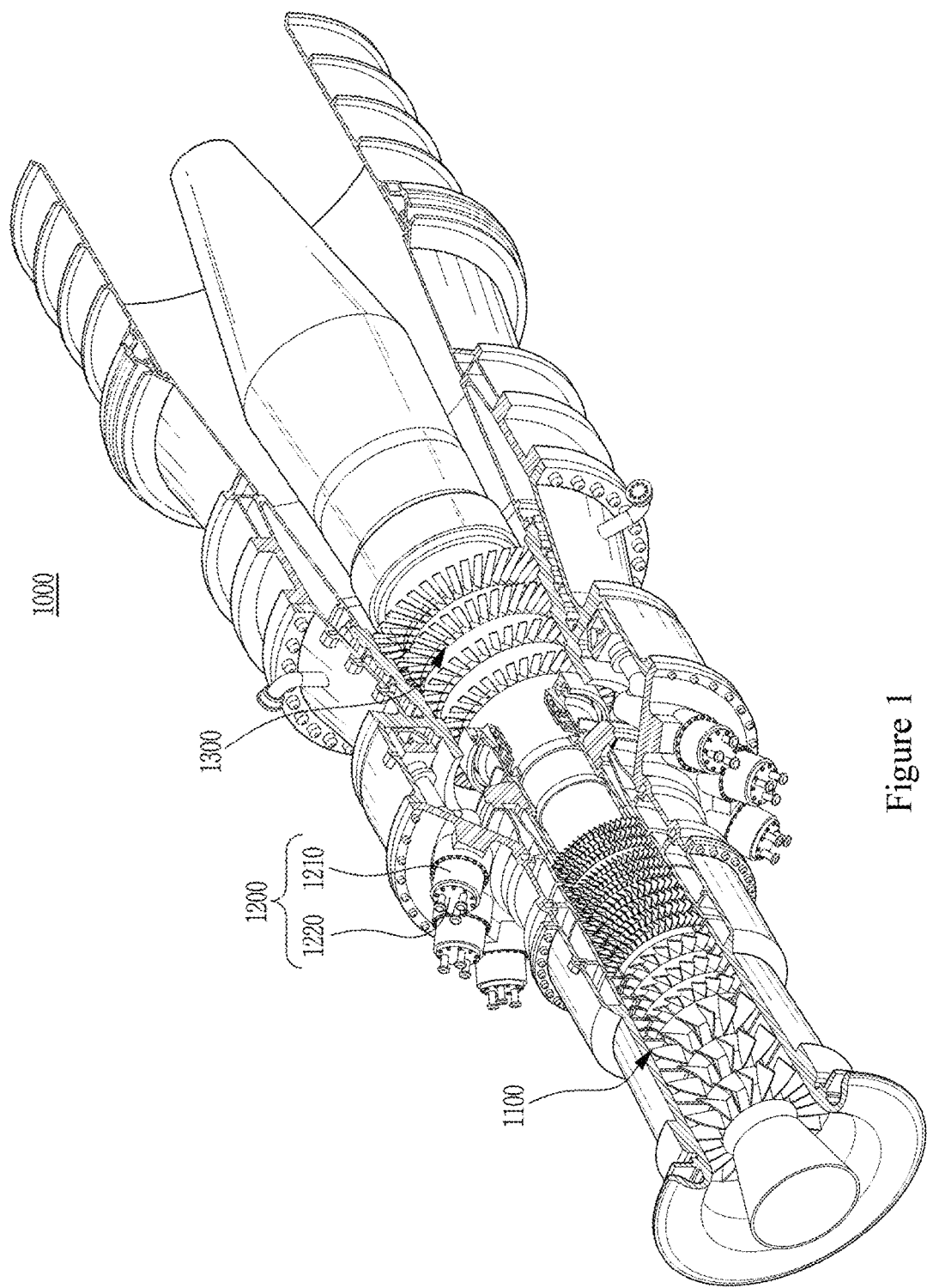
FIG. 1 shows a gas turbine according to an embodiment of the present invention.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 2:
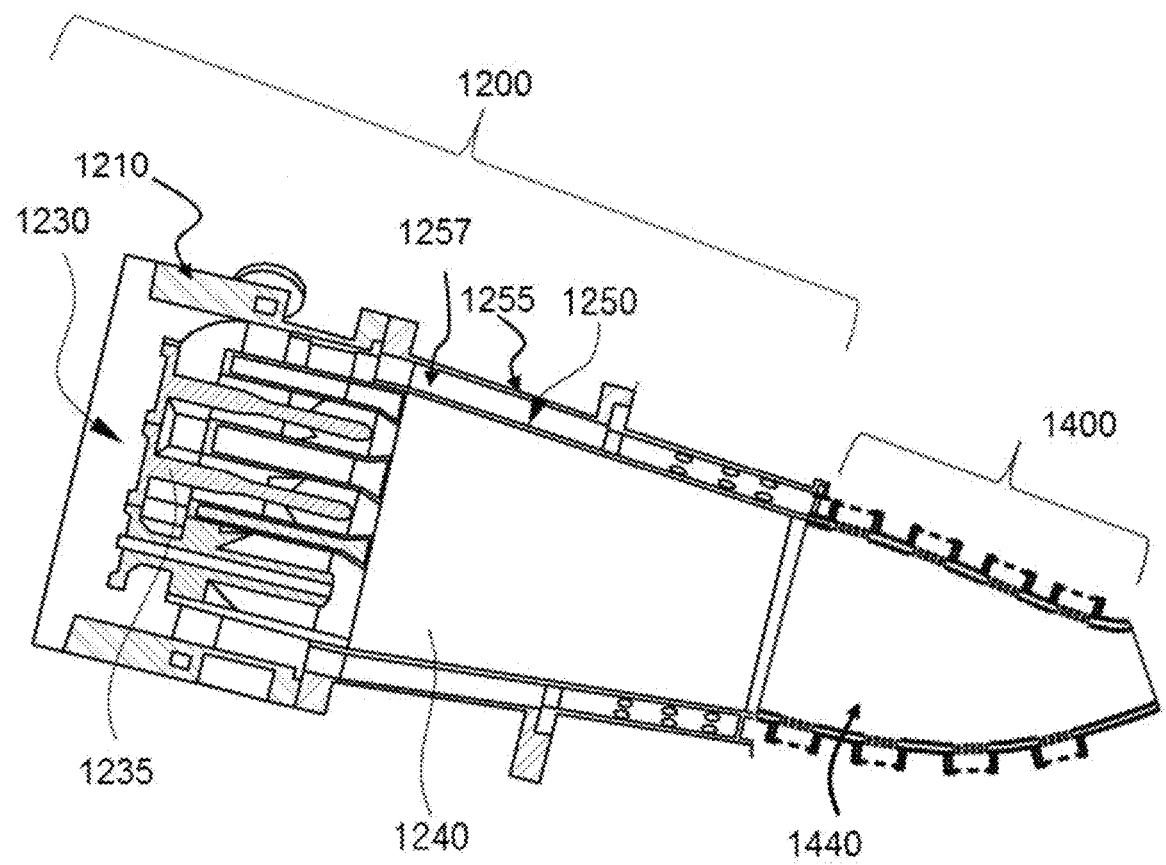
FIG. 2 shows a combustion system according to an embodiment of the present invention.

Reference will be made to the attached figures on which the same reference numerals are used throughout to indicate the same or similar components. FIG. 1 shows a gas turbine according to an embodiment of the present invention. FIG. 2 shows a combustion system according to an embodiment of the present invention. Referring to FIGS. 1 and 2, the gas turbine 1000 according to the embodiment of the present invention comprises a compressor 1100, a combustor 1200, a turbine 1300, and a transition piece 1400. The compressor 1100 includes a plurality of blades, which are arranged in a radial fashion. The compressor 1100 rotates the plurality of blades, and air is thus moved while being compressed due to the rotation of the plurality of blades. In an embodiment, the compressor 1100 may be directly or indirectly connected to the turbine 1300 so as to receive some of the power generated by the turbine 1300, which is in turn used to rotate the plurality of blades.

The air compressed in the compressor 1100 is moved to the combustor 1200. The combustor 1200 includes a plurality of casings 1210 and a plurality of burners 1220, which are arranged in a circular pattern.

The combustor 1200 comprises a head end plate 1230, a combustion chamber 1240, an inner liner 1250, an outer liner 1255, and a liner channel 1257. The outer liner 1255 defines an external wall of the combustion chamber 1240 and extends in one direction. The outer liner 1255 may be configured to have a cylindrical shape. The inner liner 1250 defines the combustion chamber 1240 and is spaced apart from the outer liner 1255 such that the liner channel 1257 is formed between the inner liner 1250 and the outer liner 1255. The casing 1210 and the head end plate 1230 cover the combustion chamber 1240 such that the compressed air provided by the compressor 1100 passes through the liner channel 1257 and then is introduced into the combustion chamber 1240.

The fuel is provided through a fuel nozzle 1235 to the combustion chamber 1240. The compressed air is mixed with the fuel and then is ignited in the combustion chamber 1240 by means of a spark plug (not shown). Subsequently, the combusted gas is discharged to the turbine 1300 so as to rotate the turbine blade through the transition piece 1400 disposed between the combustor 1200 and the turbine 1300.

The combustor 1200 is exposed to a very high temperature condition; thus, the combustor 1200 needs to be cooled down appropriately. However, the combusted gas of the combustor 1200 should remain high temperature at an inlet of the turbine 1300 in order to increase the efficiency of the gas turbine 1000. The temperature of the combusted gas is measured at the inlet as a turbine inlet temperature (TIT), and the gas turbines are classified based on the TIT because the TIT is an important factor. To increase TIT, the temperature of the combusted gas should be increased, and the high temperature of the combusted gas increases the temperatures of the combustor 1200, the turbine 1300, and the transition piece 1400 between the combustor 1200, the turbine 1300.

The inner liner 1250 and the transition piece 1400 are directly exposed to the hot combusted gas, thus proper cooling is necessary. For cooling, the transition piece 1400 can be made of a heat resistant material. Embodiments of the subject invention comprise a cooling ring or cooling block to cool down the transition piece by using impingement cooling and film cooling.

Figure 3:
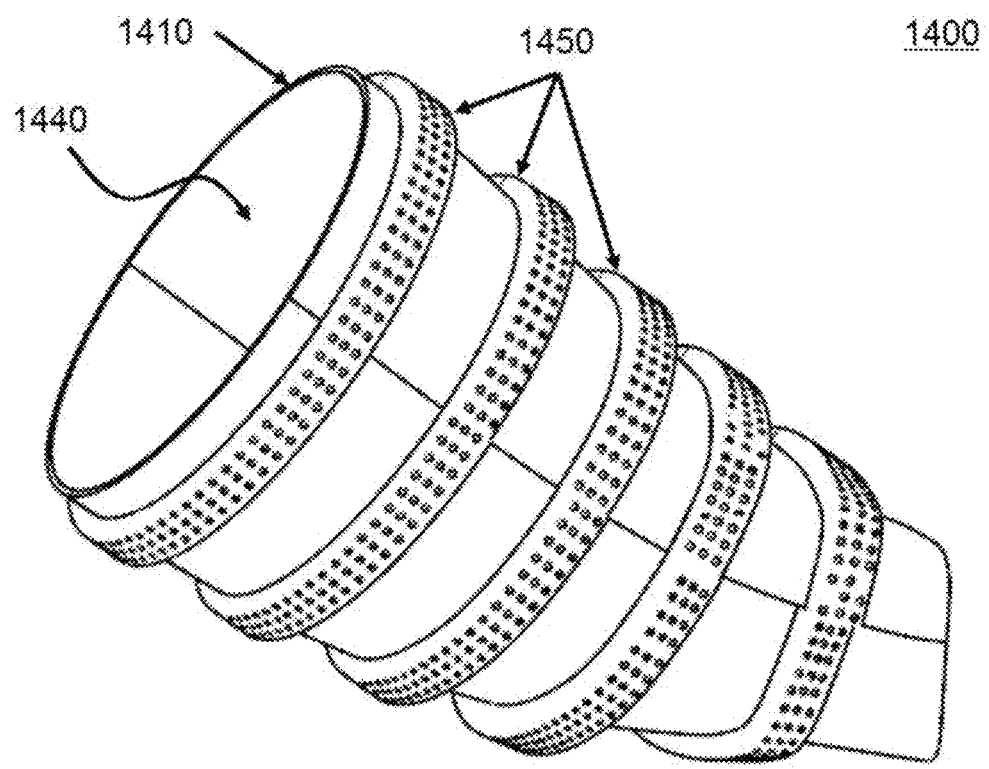
FIG. 3 shows a transition piece according to an embodiment of the present invention.
Figure 4:
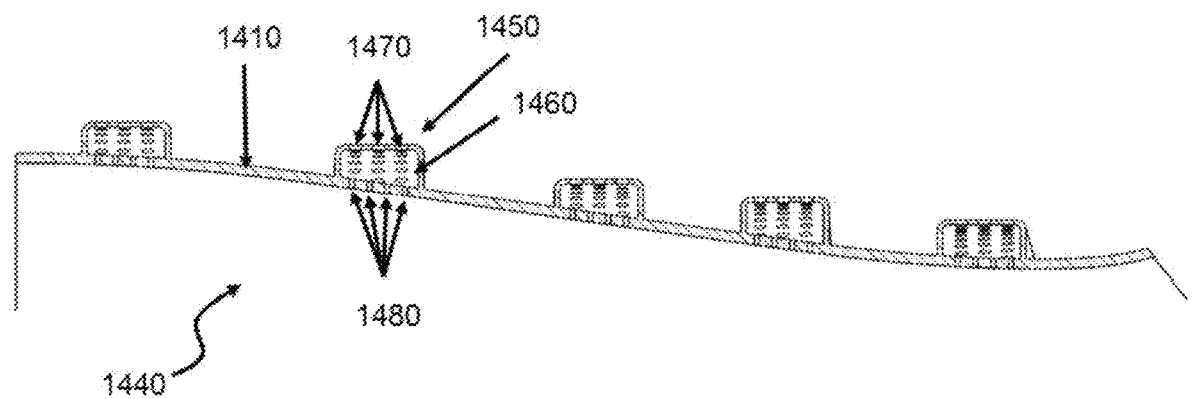
FIG. 4 shows a cross-sectional view of a transition piece according to an embodiment of the present invention.
Figure 5:
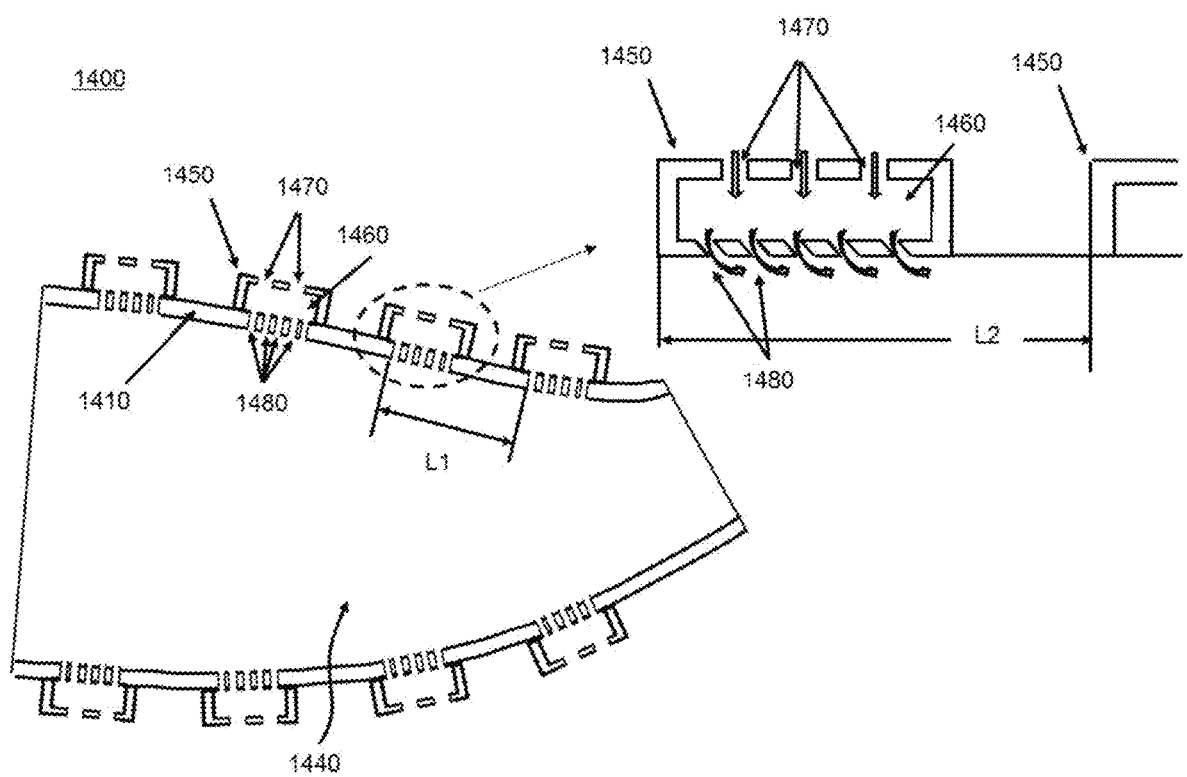
FIG. 5 shows a cross-sectional view of a transition piece according to an embodiment of the present invention.

FIG. 3 shows a transition piece according to an embodiment of the present invention. FIGS. 4 and 5 show cross-sectional views of a transition piece according to an embodiment of the present invention. Referring to FIGS. 3-5, the transition piece 1400 comprises an inner transition piece 1410 providing and defining a gas channel 1440, and a plurality of cooling rings 1450 surrounding the inner transition piece 1410. The gas channel 1440 receives the combusted gas from the combustion chamber of the combustor and transfers the combusted gas to the turbine.

The cooling ring 1450 is disposed on the inner transition piece 1410 such that a cavity 1460 is formed between the inner transition piece 1410 and the cooling ring 1450. The cavity 1460 also surrounds the inner transition piece 1410 according to the cooling ring 1450. The transition piece 1400 further comprises a plurality of impingement holes 1470 connecting the cavity 1460 to an outside of the inner transition piece 1410, and a plurality of film holes 1480 connecting the cavity 1460 to the gas channel 1440.

The film hole 1480 is formed on the inner transition piece 1410 such that the gas channel 1440 communicates with the cavity 1460, and the impingement hole 1470 is formed on the cooling ring 1450 such that the cavity 1460 communicates with the outside of the inner transition piece 1410. That is, the cooling ring 1450 covers the film hole 1480 such that the film hole 1480 is not directly exposed to the outside of the inner transition piece 1410. As a result, cool air can flow from the outside of the inner transition piece 1410 to the gas channel 1440 through the impingement hole 1470, the cavity 1460, and the film hole 1480 in series as indicated by the block arrows of FIG. 5.

When the cool air passes through the impingement hole 1470, the transition piece 1400 is cooled by impingement cooling. After that, the cool air in the cavity 1460 passes through the film hole 1480 and enters into the gas channel 1440, thereby allowing an inner surface of the inner transition piece 1410 facing the combusted gas to be cooled by film cooling.

The cool air introduced through the film hole 1480 extends to downstream (i.e., toward the turbine). Thus, the cool air cools not only the inner surface of the inner transition piece 1410 where the cooling ring 1450 is placed but also the inner transition piece 1410 where the cooling ring 1450 does not exist. Even if the film cooling extends to a region where the cooling ring 1450 does not exist, the cooling effect diminishes towards the turbine. That is, the film cooling has a limit of an effective cooling distance L1. The effective cooling distance L1 by the film cooling is also called as a stream wise distance L2. The adjacent cooling ring 1450 can be added spaced apart at a stream wise distance L2.

Comparing the impingement hole 1470 with the film hole 1480, a size of the impingement hole 1470 is larger than a size of the film hole 1480, and a number of the impingement holes 1470 is smaller than a number of the film holes 1480. While a direction of the impingement hole 1470 is toward the inner transition piece 1410, the film hole 1480 is inclined with respect to the inner transition piece 1410 toward the turbine. This inclined film hole 1480 increases the film cooling efficiency and the effective cooling distance L1. In addition, the film hole 1480 is formed to correspond to the impingement hole 1470 such that the cool air introduced by the impingement hole 1470 can easily pass through the film hole 1480.

The transition piece 1400 according to the present invention reduces combustor pressure drop, minimizes impact of emission, and provides highly efficient cooling by comprising impingement holes and film holes. Moreover, the transition piece 1400 can reduce spacing between adjacent transition pieces in the gas turbine, thereby improving accessibility and maintenance of the gas turbine.

Figure 6:
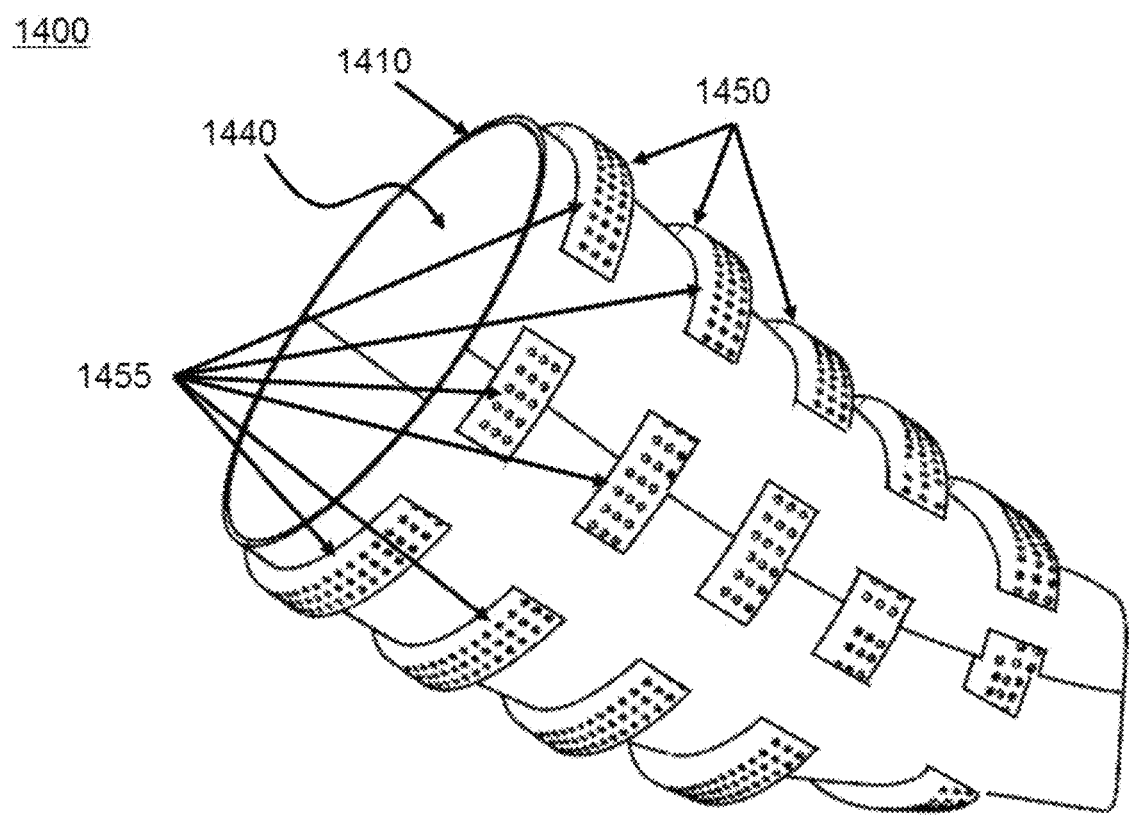
FIG. 6 shows a transition piece according to an embodiment of the present invention.

FIG. 6 shows a transition piece according to an embodiment of the present invention. Referring to FIG. 6, each of a plurality of cooling rings 1450 comprises a plurality of cooling blocks 1455. That is, one cooling ring 1450 does not form a complete circular shape but includes the plurality of cooling blocks 1455 that are arranged in a circular shape and spaced apart from each other. This structure can provide more space and reduce the weight. In another embodiment, the cooling blocks 1455 do not need to be arranged in a circular shape but can be arranged in other patterns or even without order.

Figure 7:
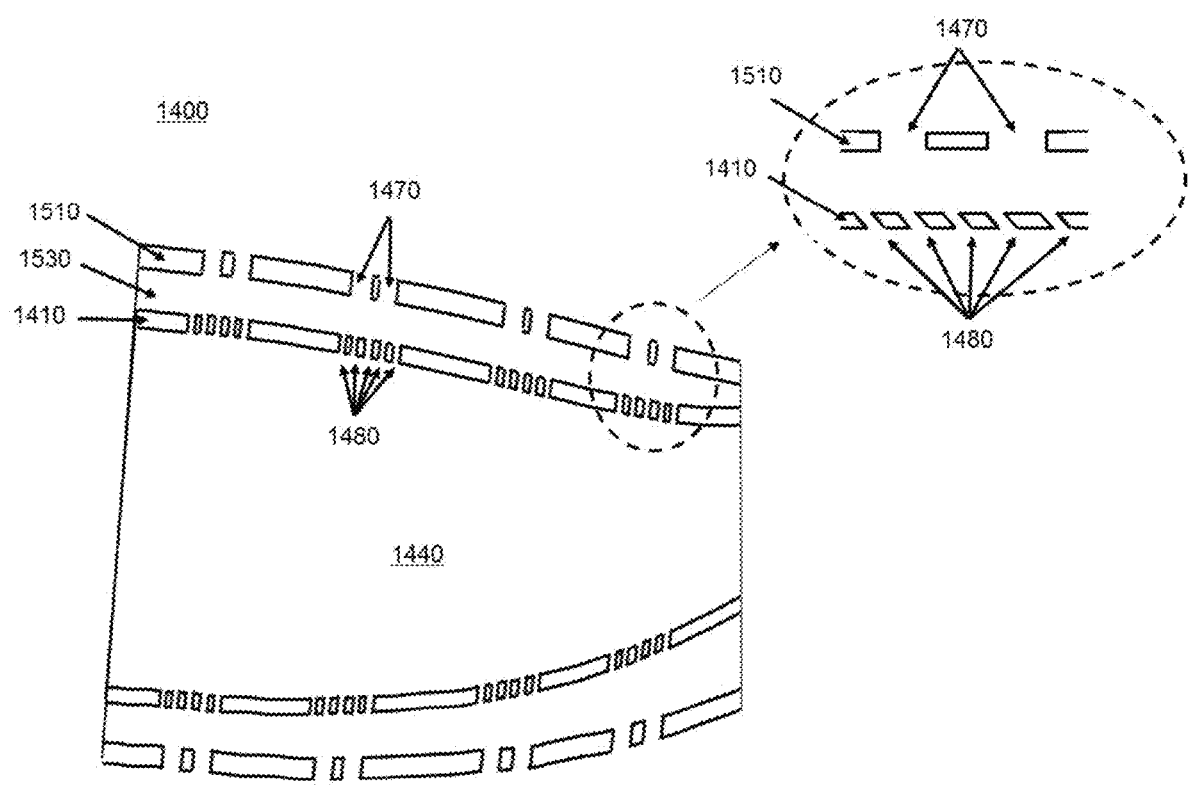
FIG. 7 shows a transition piece according to an embodiment of the present invention.

FIG. 7 shows a transition piece according to an embodiment of the present invention. Referring to FIG. 7, a transition piece 1400 comprises an inner transition piece 1410, an outer transition piece 1510, a plurality of film holes 1480, and a plurality of impingement holes 1470. The inner transition piece 1410 defines a gas channel 1440 transferring a combusted gas from a combustor to a turbine. The outer transition piece 1510 surrounds the inner transition piece 1410 and is spaced apart from the inner transition piece 1410 such that a transition piece channel 1530 is formed between the inner transition piece 1410 and the outer transition piece 1510.

The plurality of impingement holes 1470 are formed on the outer transition piece 1510 such that cool air flows through the plurality of impingement holes 1470 from an outside of the transition piece 1400 to the transition piece channel 1530. The plurality of film holes 1480 are formed on the inner transition piece 1410 such that the cool air flows through the plurality of film holes 1480 from the transition piece channel 1530 to the gas channel 1440.

A size of each impingement hole 1470 is larger than a size of each film hole 1480, and the plurality of film holes 1480 are arranged to correspond to the impingement holes. The plurality of impingement holes 1470 are formed perpendicular to the outer transition piece 1510, and the plurality of film holes 1480 are formed inclined with respect to the inner transition piece 1410 such that the cool air introduced through the plurality of film holes 1480 flows toward the turbine. The inner transition piece 1410 and the outer transition piece 1510 can be connected to the inner liner 1250 and the outer liner 1255 of FIG. 2, respectively.

The subject invention includes, but is not limited to, the following exemplified embodiments.

Embodiment 1

A transition piece, comprising:
an inner transition piece providing a gas channel;
a cooling ring disposed on the inner transition piece and providing a cavity;
a film hole connecting the cavity to the gas channel; and
an impingement hole connecting the cavity to an outside of the inner transition piece.

Embodiment 2

The transition piece according to embodiment 1, wherein the cooling ring surrounds the inner transition piece.

Embodiment 3

The transition piece according to any of embodiments 1-2, wherein a size of the impingement hole is larger than a size of the film hole.

Embodiment 4

The transition piece according to any of embodiments 1-3, wherein the film hole is inclined with respect to the inner transition piece.

Embodiment 5

The transition piece according to any of embodiments 1-4, wherein the cooling ring comprises a plurality of cooling blocks that are arranged in a circular shape and are spaced apart from each other.

Embodiment 6

The transition piece according to embodiment 5, wherein each of the plurality of cooling blocks includes a respective cavity, impingement hole, and film hole.

Embodiment 7

A transition piece, comprising:
an inner transition piece providing a gas channel;
a plurality of cooling rings disposed on the inner transition piece;
a plurality of film holes formed on the inner transition piece; and
a plurality of impingement holes formed on the plurality of cooling rings,
wherein the plurality of film holes are arranged to correspond to the plurality of cooling rings.

Embodiment 8

The transition piece according to embodiment 7, wherein each of the plurality of cooling rings surrounds the inner transition piece.

Embodiment 9

The transition piece according to any of embodiments 7-8, wherein each of the plurality of cooling rings includes a cavity.

Embodiment 10

The transition piece according to embodiment 9, wherein the plurality of film holes connect the cavity to the gas channel, and the plurality of impingement holes connect the cavity to an outside of the inner transition piece.

Embodiment 11

The transition piece according to any of embodiments 9-10, wherein the plurality of film holes and the plurality of impingement holes are arranged such that an air flows from the outside of the inner transition piece to the gas channel through the plurality of impingement holes, the cavity, and the plurality of film holes in series.

Embodiment 12

The transition piece according to any of embodiments 7-11, wherein a size of the plurality of impingement holes is larger than a size of the plurality of film holes.

Embodiment 13

The transition piece according to any of embodiments 7-12, wherein the plurality of film holes is greater in number than the plurality of impingement holes.

Embodiment 14

A gas turbine, comprising:
a compressor providing compressed air;
a combustor receiving the compressed air and producing combusted gas;
a turbine receiving the combusted gas from the combustor; and
the transition piece according to any of embodiments 7-13,
wherein the transition piece is disposed between the combustor and the turbine, and
wherein the gas channel of the transition piece receives the combusted gas and provides the combusted gas to the turbine.

Embodiment 15

The gas turbine according to embodiment 14, wherein the plurality of film holes are inclined toward the turbine.

Embodiment 16

A transition piece, comprising:
an inner transition piece providing a gas channel;
an outer transition piece surrounding the inner transition piece and spaced apart from the inner transition piece;
a plurality of film holes formed on the inner transition piece; and
a plurality of impingement holes formed on the outer transition piece.

Embodiment 17

The transition piece according to embodiment 16, wherein a size of each impingement hole is larger than a size of each film hole.

Embodiment 18

The transition piece according to any of embodiments 16-17, wherein the plurality of film holes are arranged to correspond to the impingement holes.

Embodiment 19

A gas turbine, comprising:
a compressor providing compressed air;
a combustor receiving the compressed air and producing combusted gas;
a turbine receiving the combusted gas from the combustor; and
the transition piece according to any of embodiments 16-18,
wherein the transition piece is disposed between the combustor and the turbine, and
wherein the gas channel of the transition piece receives the combusted gas and provides the combusted gas to the turbine.

Embodiment 20

The gas turbine according to embodiment 19, wherein the plurality of film holes are inclined toward the turbine.

Embodiment 21

A transition piece, comprising:
an inner transition piece providing a gas channel;
a plurality of film holes formed on the inner transition piece;
a plurality of cooling rings disposed on the inner transition piece and covering the plurality of film holes; and
a plurality of impingement holes formed on the plurality of cooling rings.

Embodiment 22

The transition piece according to embodiment 21, wherein each of the plurality of cooling rings provides a cavity between the inner transition piece and each cooling ring.

Embodiment 23

The transition piece according to embodiment 22, wherein the plurality of film holes connect the cavity to the gas channel, and the plurality of impingement holes connect the cavity to an outside of the transition piece.

Embodiment 24

The transition piece according to any of embodiments 21-23, wherein the plurality of cooling rings are spaced apart from each other.

Embodiment 25

The transition piece according to embodiment 24, wherein adjacent cooling rings are spaced apart from each other at an effective cooling distance.

Embodiment 26

The transition piece according to any of embodiments 21-25, wherein a cross-sectional view of the cooling ring has a rectangular shape.

Embodiment 27

A transition piece, comprising:
an inner transition piece providing a gas channel;
a plurality of film holes formed on the inner transition piece;
a plurality of cooling blocks disposed on the inner transition piece and covering the plurality of film holes; and a plurality of impingement holes formed on the plurality of cooling blocks.

Embodiment 28

The transition piece according to embodiment 27, wherein each of the plurality of cooling blocks provides a cavity between the inner transition piece and each cooling block.

Embodiment 29

The transition piece according to embodiment 28, wherein the plurality of film holes connect the cavity to the gas channel, and the plurality of impingement holes connect the cavity to an outside of the transition piece.

Embodiment 30

The transition piece according to any of embodiments 27-29, wherein the plurality of cooling blocks are arranged in a circular shape such that the plurality of cooling blocks surround the inner transition piece.

Embodiment 31

The transition piece according to any of embodiments 27-29, wherein the plurality of cooling blocks are arranged in a direction from a combustor to a turbine.

Embodiment 31

The transition piece according to any of embodiments 27-31, wherein the plurality of cooling blocks are spaced apart from each other.

It should be understood that the examples and embodiments described herein are for illustrative purposes only and that various modifications or changes in light thereof will be suggested to persons skilled in the art and are to be included within the spirit and purview of this application. Thus, the invention is not intended to limit the examples described herein, but is to be accorded the widest scope consistent with the principles and novel features disclosed herein.

What is claimed is:

1. A transition piece having a first end configured to be coupled to a turbine and a second end disposed opposite to the first end and configured to be coupled to a combustor, the transition piece comprising:
    an inner transition piece providing a gas channel, the inner transition piece including
      an inner surface facing the gas channel, and
      an outer surface disposed opposite to the inner surface so as to face an outside of the inner transition piece, the outside of the inner transition piece configured to receive a flow of cooling air in an axial direction of the transition piece, the cooling air flowing over the transition piece from the first end to the second end;
    a plurality of cooling rings disposed on the outer surface of the inner transition piece and separated from each other in the axial direction, each cooling ring of the plurality of cooling rings including a three-sided structure configured with the outer surface to form a continuous cavity having an annular shape surrounding the inner transition piece, the three-sided structure including two axially facing sides respectively connected to the outer surface of the inner transition piece, and an outwardly disposed side connecting the two axially facing sides, the two axially facing sides substantially parallel to each other such that each of the two axially facing sides is substantially perpendicular to the outer surface of the inner transition piece, the outwardly disposed side facing the outside of the inner transition piece in a radial direction and receiving the flow of cooling air in the axial direction of the transition piece;
    a plurality of cooling rings disposed on the outer surface of the inner transition piece and separated from each other in the axial direction, each cooling ring of the plurality of cooling rings including a three-sided structure configured with the outer surface to form a continuous cavity having an annular shape surrounding the inner transition piece, the three-sided structure including the flow of cooling air in the axial direction of the transition piece;
    a plurality of film holes formed through the inner transition piece and configured to enable the continuous cavity of each of the plurality of cooling rings to communicate with the gas channel; and
    a plurality of impingement holes formed through the outwardly disposed side of the cooling ring and configured to enable the continuous cavity of each of the plurality of cooling rings to communicate with the outside of the inner transition piece,
    wherein the outwardly disposed side of each cooling ring of the plurality of cooling rings receives a portion of a downstream flow of the cooling air from the first end to the second end, the downstream flow of the cooling air flowing in the axial direction and passing over the outwardly disposed side of each cooling ring of the plurality of cooling rings,
    wherein the plurality of film holes are configured to enable the continuous cavity to communicate with the gas channel and the plurality of impingement holes are configured to enable the continuous cavity to communicate with the outside of the inner transition piece, such that the portion of the downstream flow of the cooling air flows from the outside of the inner transition piece to the gas channel through a series arrangement of the plurality of impingement holes, the continuous cavity, and the plurality of film holes,
    wherein the cooling air having passed through the plurality of impingement holes but not having passed through the plurality of film holes passes through the continuous cavity by passing between the two axially facing sides of the three-sided structure and by not passing through either of the two axially facing sides of the three-sided structure,
    wherein the plurality of cooling rings include a first cooling ring and a second cooling ring that are spaced apart from each other by a streamwise distance (L2) between a trailing side of the first cooling ring and a trailing side of the second cooling ring,
    wherein the plurality of film holes include a first plurality of cooling ring holes arranged to correspond to the first cooling ring and a second plurality of cooling ring holes arranged to correspond to the second cooling ring, the first plurality of cooling ring holes having an effective cooling distance (L1) with respect to the second plurality of cooling ring holes, and
    wherein the streamwise distance is substantially equal to the effective cooling distance.

2. The transition piece according to claim 1, wherein a size of the plurality of impingement holes is larger than a size of the plurality of film holes.

3. The transition piece according to claim 2, wherein the plurality of film holes is greater in number than the plurality of impingement holes.

* * * * *